US007383351B1

(12) United States Patent
Sundaresan et al.

(10) Patent No.: US 7,383,351 B1
(45) Date of Patent: Jun. 3, 2008

(54) METHOD AND APPARATUS FOR EFFICIENT SPVC DESTINATION ENDPOINT ADDRESS CHANGE

(75) Inventors: Krishna Sundaresan, Sunnyvale, CA (US); Mahesh Chellappa, San Jose, CA (US); Daniel Cauchy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 616 days.

(21) Appl. No.: 09/996,486

(22) Filed: Nov. 27, 2001

(51) Int. Cl.
*G06F 15/16* (2006.01)
(52) U.S. Cl. .................................................. 709/238
(58) Field of Classification Search ..................... None
See application file for complete search history.

(56) References Cited

U.S. PATENT DOCUMENTS

| | | | |
|---|---|---|---|
| 6,002,674 A * | 12/1999 | Takei et al. ................. | 370/254 |
| 6,138,161 A * | 10/2000 | Reynolds et al. ........... | 709/227 |
| 6,160,808 A | 12/2000 | Maurya | |
| 6,208,623 B1 * | 3/2001 | Rochberger et al. ........ | 370/254 |
| 6,243,384 B1 * | 6/2001 | Eriksson et al. ....... | 370/395.31 |
| 6,563,816 B1 * | 5/2003 | Nodoushani et al. ........ | 370/352 |
| 6,578,085 B1 * | 6/2003 | Khalil et al. ................ | 709/241 |
| 6,606,303 B1 * | 8/2003 | Hassel et al. ................ | 370/238 |
| 6,611,525 B1 * | 8/2003 | Natanson et al. ...... | 370/395.53 |
| 6,724,881 B1 | 4/2004 | McAllister et al. | |
| 6,754,716 B1 * | 6/2004 | Sharma et al. .............. | 709/238 |
| 6,934,249 B1 | 8/2005 | Bertin et al. | |
| 7,039,014 B1 | 5/2006 | Krishnamurthy et al. | |
| 7,233,571 B1 | 6/2007 | Krishnamurthy et al. | |

OTHER PUBLICATIONS

Minoli, D., "Enterprise Networking, *Fractional Tl to SONET, Frame Relay to BISDN*," 1993 Artech House, Inc. 685 Canton Street Norwood, MA 02062, p. 548 Figure 10.9, and pp. 551-556, (12 pgs. total with cover, copyright and table of content pages), ISBN: 0-89006-621-3.
Woods, D., "IISP and PNNI Blaze a Simpler Route," Feb. 19, 2001, pp. 4, www.networkcomputing.com/1204/1204ws1.html.
"Soft-ATM Private Network-to-Network Interface (PNNI)," http://www/ikon-gmbh.de/german/datasheets/netplane/pnni.htm (Jul. 12, 2001).
"PNNI: A little background," http://www.antc.utwente.nl/Reports/ATM/PNNI/pnni_background.html (Sep. 19, 2001).
"Protocol Directory - ATM Signaling & Routing," http://www.protocols.com/pbook/atmsig.htm (Nov. 14, 2001).
The ATM Forum Technical Committee, "Modification of Traffic Parameters for an Active Connection Signalling Specification (PNNI, AINI, and UNI), Version 2.0," ATM Forum document number AF-CS-0148.001, May 2001.
The ATM Forum Technical Committee, "ATM User-Network Interface (UNI) Signalling Specification, Version 4.0," ATM Forum document number af-sig-0061.000, Jul. 1996.

* cited by examiner

*Primary Examiner*—David Y. Eng
(74) *Attorney, Agent, or Firm*—Blakely, Sokoloff, Taylor & Zafman LLP

(57) ABSTRACT

A method for automatically reconfiguring a soft permanent virtual circuit (SPVC) source endpoint in a PNNI ATM network, in response to an address change at a destination endpoint, by encoding the address change information in a SIG field in a PNNI topology state element within a PNNI topology state packet.

28 Claims, 6 Drawing Sheets

METHOD AND APPARATUS FOR EFFICIENT SPVC DESTINATION ENDPOINT ADDRESS CHANGE

FIELD OF THE INVENTION

The field of invention relates to networking, generally; and, more specifically, to a method and apparatus for efficient SPVC destination endpoint address change.

BACKGROUND

An exemplary Private Network Node Interface (PNNI) Asynchronous Transfer Mode (ATM) network 101 is shown in FIG. 1. ATM is a networking technology that transports information with "cells" of data. As such, if a significantly sized body of information (e.g., a document or file) is to be transported across an ATM network, the body of information is effectively "broken down" into a plurality of cells. The plurality of cells are then individually sent across the network and reassembled at the receiving end in order to reconstruct the original body of information.

The term "connection" or "circuit" is often used to describe a pre-defined path through a network. Typically, when a body of information is to be transported over a network, a connection is setup beforehand that establishes (in some manner and to some extent) the path that the cells will take. Various types of connections may be used within an ATM network 101. These include: 1) permanent virtual circuits (PVCs); 2) switched virtual circuits (SVCs); and 3) soft permanent virtual circuits (SPVCs).

In the case of PVCs, a quasi-permanent connection is established (e.g., a connection that lasts for days, weeks, months, etc.). PVCs are often used in situations where a large corporate user desires to permanently clear a guaranteed pipe through the network 101 from one large office to another large office. For example, if node $105_1$ corresponds to the Customer Premise Equipment (CPE) of a first corporate office and node $105_2$ corresponds to the CPE of a second corporate office, a PVC may be established that couples nodes $102_1$, $102_4$, $102_7$ and network lines $103_3$, $103_{11}$ together (in order to form an end-to-end path through the network 100 between CPEs $105_1$ and $105_2$).

Generally, the amount of traffic (e.g., as between two large corporate offices) and the extent of the usage (e.g., every business day for the foreseeable future) justifies the costs associated with dedicating, in a quasi-permanent fashion, a fixed amount of the network's resources to one particular pathway. Typically, a PVC is manually configured by a network manager from a network management control station 104. As such, commands are issued from the network management control station 104 to the various nodes in the network 101 that "make up" the PVC (so that the lookup tables, etc. within these nodes can be properly updated).

Another characteristic of a PVC is that a PVC user simply directs traffic into the network 101 (e.g., from node $105_1$) with little or no formal request for transportation services from the network 101. For example, typically, a PVC user at node $105_1$ will send ATM cells having the PVC's Virtual Path Identifier/Virtual Channel Identifier (VPI-VCI) across the ATM User Network Interface (UNI) at link $103_1$. Based upon the VPI-VCI information, node $102_1$ (e.g., as well as subsequent nodes along the PVC path) will be able to properly switch the cells onto a link that corresponds to the PVC path. Thus, because the connection is quasi-permanent and has already been established, there is little or no procedural overhead associated with connection setup (such as a SETUP request message and the like). The user is provided an appropriate VPI-VCI well beforehand (e.g., shortly after PVC setup) which is invoked each time thereafter by the user when the services of the PVC are desired.

SVCs, on the other hand, are established on a temporary basis rather than a quasi-permanent basis. SVCs efficiently utilize the resources of a network if the network has to support a large number of different connection paths over a fairly brief period of time (e.g., seconds, minutes, hours). In contrast to PVCs, SVCs are usually established on a "call-by-call" basis and therefore have: 1) some form of formal user request to the network 101 for transportation services; and, 2) a connection "setup" procedure that follows the request for transportation services and a connection "teardown" procedure that follows the successful performance of the requested transportation services.

The connection setup/teardown procedures may be viewed as the "automatic" configuration of a connection within the network rather than manual configuration from a network management control station 104. PNNI is a routing and signaling protocol that determines and establishes connection paths. The PNNI routing protocol is executed on the source endpoint (e.g., source endpoint $102_1$ for connections initiated from originating node $105_1$), and is often referred to as a "source" routing protocol. An example of PNNI's routing and signaling techniques are provided immediately below.

If node $105_1$ (the "originating" node) desires to send information to node $105_2$ (the "target" node), the originating node $105_1$ will effectively request the network 101 for a connection to be established between nodes $105_1$ and node $105_2$. Typically, this request takes the form of a SETUP message that is passed over the ATM UNI at link $103_1$. The access node $102_1$ (which may be referred to as the source endpoint node) receives the SETUP message and determines an appropriate path for the connection through the network via the PNNI routing protocol.

The SETUP message then traverses the network 101 to the destination endpoint node $102_7$. When the SETUP message is received at the destination endpoint node $102_7$, a CONNECT message is issued from the destination endpoint node $102_7$ to the source endpoint node $102_1$. The CONNECT message "bounces", node-by-node, along the connection path to the source endpoint node $102_1$. Each node that receives the CONNECT message updates its lookup table (or other routing/switching platform) with an appropriate reference to the connection being established. When the source endpoint node $102_1$ receives the CONNECT message, the VPI-VCI for the connection is passed to the user at the ATM UNI (along link $103_1$), the connection is established, and transportation services may commence. After the transportation services are complete, the connection is torn down in a manner similar to that in which it was established.

An SPVC is often viewed as a blending of an SVC and a PVC. SPVCs are often used to provide guaranteed bandwidth to a particular user (such that the user enjoys service as if a permanent pipe has been established through the network 101) while, simultaneously, the network 101 is allowed to flexibly adapt to different connection paths over brief periods of time (by establishing each SPVC communication with connection setup and teardown procedures). In order to implement an SPVC service, the endpoint nodes of the ATM network 101 (e.g., source node $102_1$ and destination node $102_7$) are configured to behave like PVC nodes with respect to the user (e.g., along the ATM UNI at link $103_1$) while behaving like SVC nodes within the ATM network 101 itself.

With an SPVC, the source and destination endpoint nodes $102_1$ and $102_7$ are usually manually configured by the network management station 104 to provide a PVC interface to the users at node $105_1$ (and at node $105_2$). That is, for example, a quasi permanent VPI-VCI is provided to the user that is to be invoked each time the services of the SPVC are desired. Upon the receipt of ATM cells having this VPI-VCI information, however, the endpoint source node $102_1$ triggers the release of a SETUP message which traverses the network 101 to destination endpoint node $102_7$. A CONNECT message is returned to the endpoint source node $102_1$, and the SPVC is established.

FIGURES

The present invention is illustrated by way of example, and not limitation, in the Figures of the accompanying drawings in which.

DESCRIPTION

Figure 1:
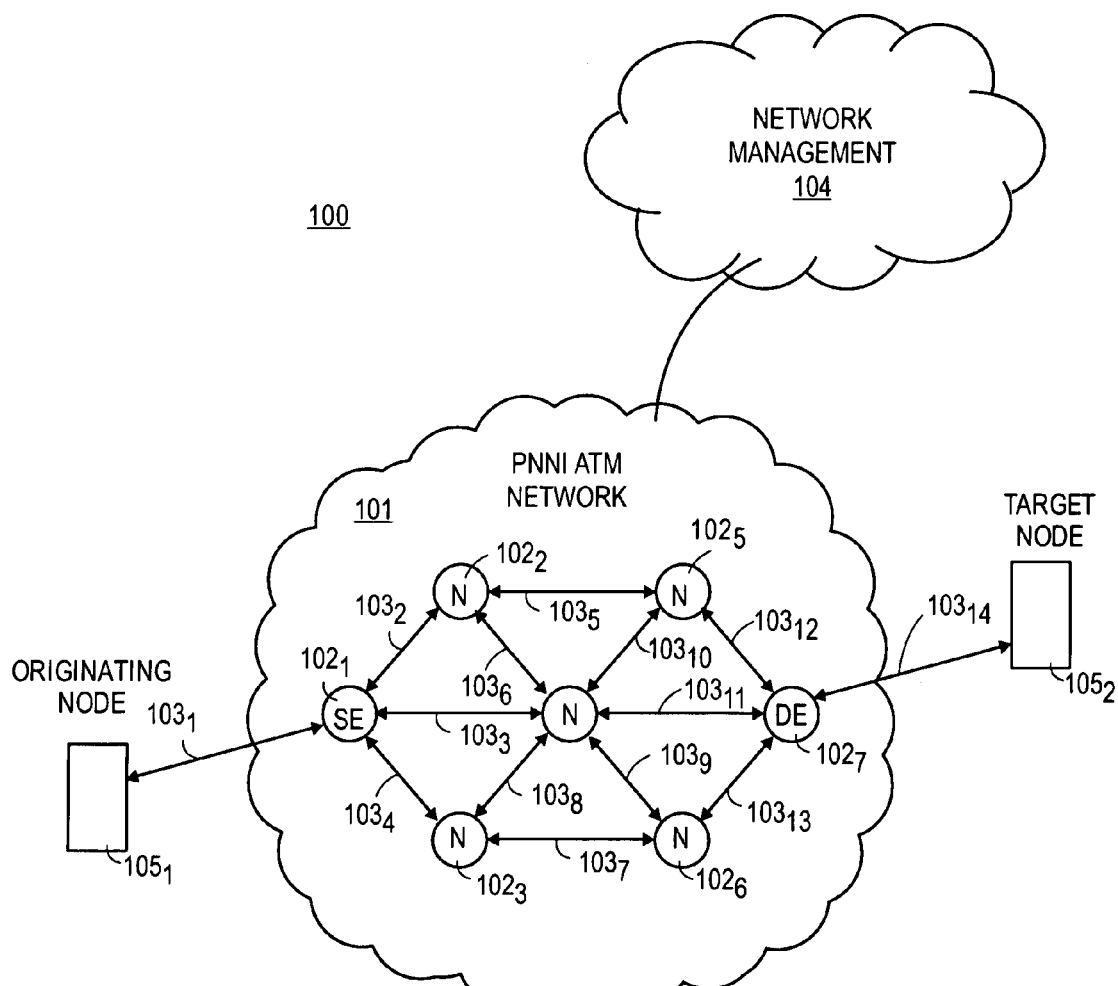
FIG. 1 shows an embodiment of a PNNI ATM network.

A problem with SPVC connections is the inefficiencies associated with changing the address of destination endpoint node. That is, each node $102_1$ through $102_7$ is referenced according to its own unique address. Examples include the Network Service Access Point (NSAP) addressing format or the E.164 addressing format. If the address of the destination endpoint node changes, a change should be made to each source node that handles a PVC or SPVC that is directed to the particular endpoint destination node whose address is being changed.

For example, using the SPVC example referred to above as a basis for discussion, if destination endpoint destination node $102_7$ is to undergo a change in address value then source endpoint node $102_1$ should reflect this change so that SETUP messages for subsequent SPVC connections will be properly directed to destination endpoint node $102_7$. As discussed, the configuration of an SPVC endpoint node is typically performed via manual efforts that are exerted from the network management station 104.

As such, the SPVC information of source endpoint node $102_1$ will be manually reconfigured to reflect the address change of destination endpoint node $102_7$. Furthermore, to the extent that node $102_7$ acts as a destination endpoint node for other SPVCs within network 101, the corresponding source endpoint nodes for each of these SPVCs should be similarly reconfigured. For example, if nodes $102_2$, $102_3$, $102_5$, and $102_6$ each behave as a source endpoint node for an SPVC that is directed to node $102_7$, each of these nodes $102_2$, $102_3$, $102_5$, and $102_6$ will also be manually reconfigured to reflect a change in the destination endpoint node $102_7$.

In complex networks where a single node can act as the destination endpoint for hundreds or thousands of SPVCs, an extensive manual effort may be required to reconfigure the source endpoint of each of these SPVCs. The result is high network maintenance and management costs. The inefficiencies associated with the changing of a destination endpoint address can be improved, however, by building a mechanism into the network 101 that automatically reconfigures each SPVC source endpoint that is affected by a change in an SPVC destination endpoint node address change.

Because the reconfiguration of each affected SPVC source endpoint node is automatic, the reconfiguration can be successfully completed in the absence of manual efforts that are directed from the network management control station 104. As such, an improvement in network management efficiency is realized. Automatic reconfiguration may be accomplished via the use of PNNI Topology State Elements (PTSEs) which are described in more detail below.

As discussed, PNNI is a routing and signaling protocol that is executed on each node in the network 101. As part of the PNNI scheme, each node is designed to "broadcast" information pertaining to its understanding of itself and/or the network in which it resides. These broadcasts may occur at specific time intervals and/or upon the occurrence of certain special events.

For example, if a node $102_5$ observes that networking link $103_{10}$ is not working, the node $102_5$ will broadcast this event to its neighboring nodes $102_2$, $102_7$. Upon the reception of this information, the neighboring nodes $102_2$, $102_7$ will "update" their internal understandings of the network (to reflect this event) as well as rebroadcast this event to their neighboring nodes so that they may update their internal understandings as well. The information is continually rebroadcast as appropriate so that the affected nodes can update their understandings of the network and behave accordingly.

Thus, in a sense, the occurrence of the event ripples through the network so that its constituent nodes can cohesively route information around the downed link $103_{10}$ in response. In other cases, typically, the network's nodes $102_1$ through $102_7$ are also configured to broadcast current status information as well as special events. Thus, on a broader scale, the nodes of the network may be said to communicate procedural (e.g., "control") information with one another as well as the substantive information associated with user traffic.

This control information is often organized into one or more PNNI Topology State Elements (hereinafter, referred to as PTSEs) that are embedded into a PNNI Topology State Packet (hereinafter, referred to as a PTSP). A PTSP is a packet that acts as the broadcast mechanism while a PTSE acts as a component of the PTSP's payload. Thus, for example, if a node has information to broadcast it issues a PTSP that carries one or more PTSEs that each have the information to be communicated. An embodiment 200 of a PTSP is shown in FIG. 2 and an embodiment 301 of a PTSE is shown in FIG. 3.

Figure 2:
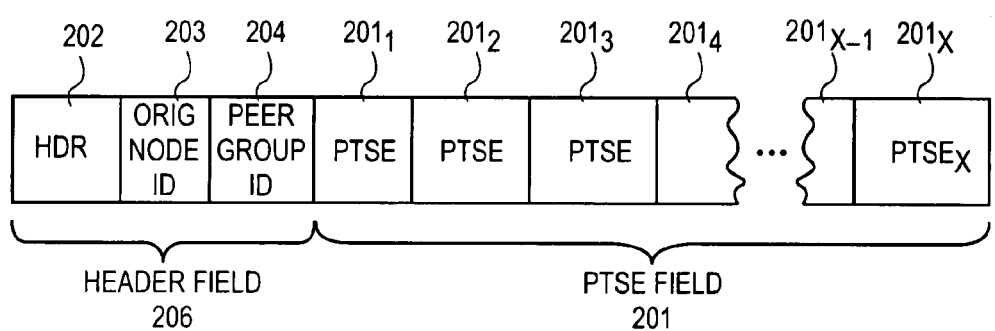
FIG. 2 shows an embodiment of a PNNI Topology State Packet (PTSP).
Figure 3:
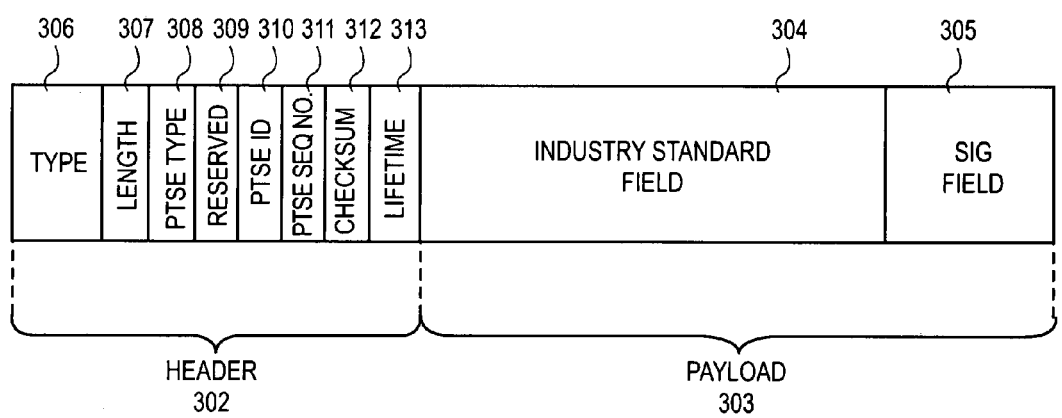
FIG. 3 shows an embodiment of a PNNI Topology State Element (PTSE) that may be embedded within the PTSP of FIG. 2.

Referring to FIG. 2, a PTSP may be viewed as having a header field 206 and a PTSE field 201. The header field 206 has various header information (e.g., checksum info, lifetime, etc.) as well as the identification of the node that is issuing the PTSP (which is located within the originating node ID field 203), the peer group within which the originating node resides (which is located within the Peer Group ID field 204). PNNI Peer groups are discussed in more detail toward the end of this description.

The PTSE field 201 includes one or more PTSEs 201₁ through 201ₓ. An embodiment 301 of a PTSE is shown in FIG. 3. That is, for example, the PTSE embodiment 301 of FIG. 3 may be viewed as corresponding to the PTSE 201₁ of FIG. 2. Referring to FIG. 3, note that a PTSE may also be viewed as having a header field 302 and a payload field 203. The header field 302 includes various header information such as a type field 306 that identifies the data structure 301 as a PTSE, a length field 307 that identifies the length of the PTSE, a reserved field 309 for potential future uses and a checksum field 312.

The PTSE header field 302 also includes a identifier field 310 that identifies the type of PSTE that PTSE 301 corresponds to. That is, PNNI employs a characterization scheme so that specific types of information can be binned together or recognized within a common PTSE format. The various PTSE types include (among possible others): 1) Horizontal Link; 2) Uplink; 3) External Address; 4) Internal Address; 5) Nodal Parameters (Complex Node); and 6) Nodal. Those of ordinary skill can identify the purpose and/or use of each PTSE type.

However, it is noteworthy to point out that the "Nodal" PTSE type is typically used to broadcast status information about the node that originates the PTSE. As such, it is an appropriate PTSE type for broadcasting a change in an SPVC destination endpoint address. Specifically, in one embodiment, the PNNI scheme is extended such that any node which experiences both an address change and acts as a destination endpoint for one or more SPVCs is configured to issue a PTSP having a "Nodal" PTSE that includes information which indicates that an address change is at hand.

Referring to the PTSE embodiment 301 of FIG. 3, note that the payload field 303 may be viewed as being partitioned into an "industry standard" field 304 and a System Capabilities Information Group (SIG) field 305. The industry standard field 304 is used to carry specific information according to a specific format that has been articulated by the PNNI standard. The SIG field 305, by contrast, is used for developers of PNNI compliant networking gear that seek to include special features beyond those recognized or articulated by the PNNI standard.

Through the use of the SIG field 305, two nodes from the same manufacturer can communicate information with one another that is not specifically provided for by the PNNI standard; while, at the same time, operate in compliance with the PNNI standard. That is, those nodes that can understand and use the contents of the SIG field 305 may do so while those that do not understand the SIG field 305 contents may simply ignore its information (as well as forward the PTSE having the SIG field to another node via a rebroadcast effort).

Figure 4:
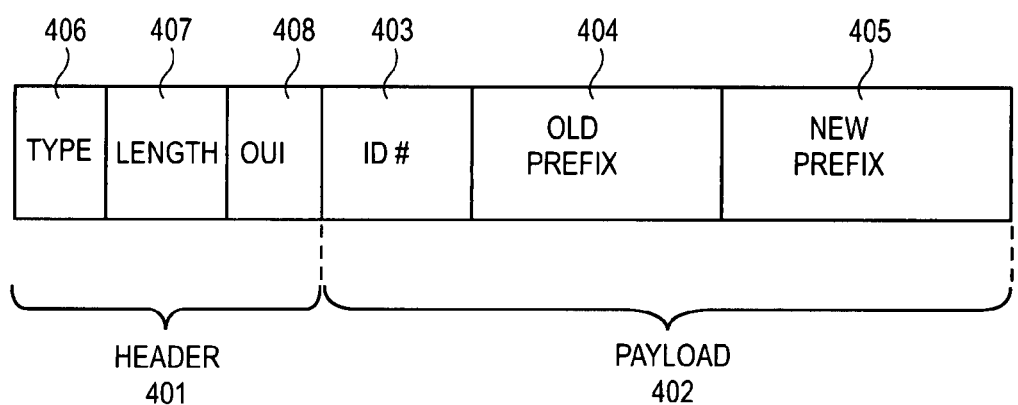
FIG. 4 shows an embodiment of a System Capabilities Information Group (SIG) field that may be embedded within the PTSE of FIG. 3.

FIG. 4 shows an embodiment 405 of a SIG field. That is, the SIG field 405 of FIG. 4 may be viewed as an embodiment of the SIG field 305 of FIG. 3 that can be used to express the address change of an SPVC endpoint. The SIG field embodiment 405 of FIG. 4 can also be viewed as having a header field component 401 and a payload field component 402.

The header field component 401 includes various header information such as a type field 406 (that indicates the data structure 405 is a SIG field), a length field 407 that describes its length and a an Organization Unique Identifier (OUI) field 408 that is typically used to recognize the manufacturer of the node that issued the SIG information (i.e., is a "vendor-specific" label). As a SIG field is typically used by the nodes of a common manufacturer to support functional improvements (beyond the PNNI standard) that are unique to the products of the manufacturer, the OUI field 408 is often used by a node to decide whether or not to ignore a received SIG field. That is, if the vendor specific label of the OUI field 408 "matches" the vendor of the node that receives the SIG information, the SIG information will be "looked into"; otherwise, the SIG information will be discarded.

Within the payload 402 of the SIG field 405, the ID # field 403 identifies the particular type of information being delivered by the SIG 405. This allows a node that supports vendor-specific functionality to understand the specific type of information enclosed in the payload 402. As such, in an embodiment, a specific binary number is used to identify that the SIG field 405 includes information related to the address change of an SPVC endpoint destination node. In the particular embodiment of FIG. 4, the old address of the SPVC endpoint destination node is identified in the Old Prefix field 404 and the new address of the SPVC endpoint destination node is identified in the New Prefix field 405.

In a further embodiment, the prefix fields 404, 405 are specified according to the NSAP node identification technique. The NSAP node identification technique, however, is often used to not only identify a particular node but also identify a particular port within a node. A port can be viewed as the architectural component of a node that collects traffic destined for a particular user or otherwise organizes the bandwidth of a node to finer degrees of granularity than the total bandwidth of the node.

For example (and referring briefly back to FIG. 1), an SPVC having node 102₇ as its destination endpoint node may effectively set aside a portion of the bandwidth of link 103₁₄ for the use of the particular user associated with the SPVC. As such, an output port may be said to exist within node 102₇ that collects the information that is destined to be sent to the user over link 103₁₄ with this pre-defined bandwidth portion. Other output ports of node 102₇ may also be similarly identified for other SPVC users that are serviced by node 102₇ and consume other bandwidth portions of link 103₁₄.

Accordingly, if the NSAP identification technique is used to fill prefix fields 404 and 405, the prefix fields 404, 405 may not only identify the node that is experiencing an address change but may also identify some further granulized component of the node (e.g., such as an output port that services a particular SPVC user). Nevertheless, the further granulized component can be effectively ignored by a node that receives the SIG information. That is, the network can automatically reconfigure itself based upon nodal information alone.

Accordingly, in various embodiments, a node that serves as a destination endpoint node for an SPVC can trigger the release of a PTSP having a PTSE with embedded SIG information that includes: 1) the previous address of the endpoint node; and 2) the new address of the endpoint node. In one embodiment, referring briefly back to FIG. 1, the network management station 104 provides a change of address command to the destination endpoint node 102₇ via an SNMP (signaling network management protocol) command or other technique, for example. When the destination endpoint node 102₇ recognizes that its address has changed, it issues at least one PTSP to broadcast the fact that an address change is at hand. In one embodiment, a method includes: receiving at a node, notification of an address change of the node, the node within a PNNI ATM network, the node a destination endpoint for an SPVC that flows within the PNNI ATM network to the node; and issuing from the node PTSE information that has SIG information, the SIG information describing the address change.

Figure 5:
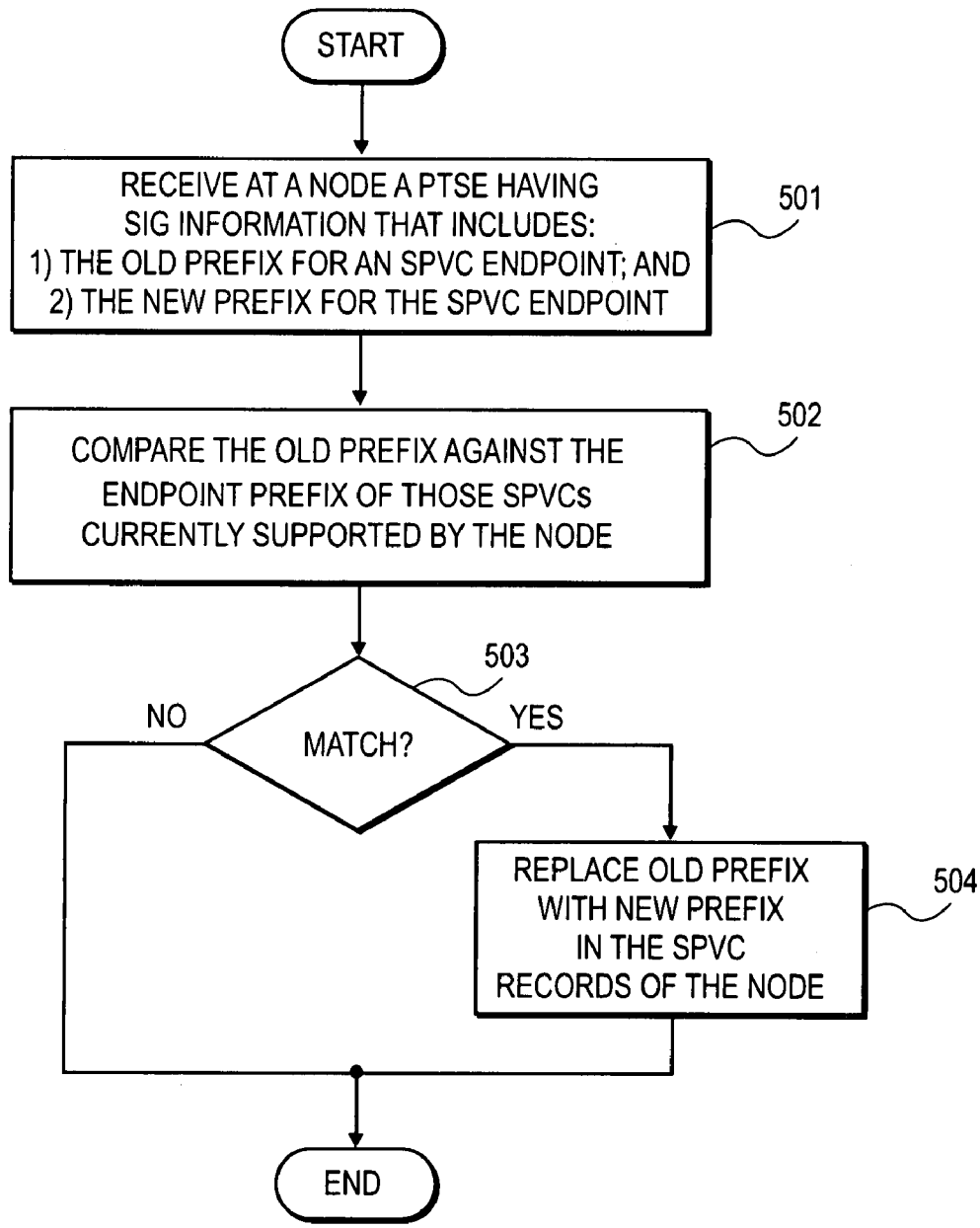
FIG. 5 shows an embodiment of a methodology that may be executed by an SPVC source endpoint in order to reconfigure itself so that a change in the SPVC destination endpoint can be recognized.

FIG. 5 shows an embodiment of a methodology that may be executed by any of the other nodes $102_1$ through $102_6$ within the network 101 in response to the reception 501 of the PTSP. First, a receiving node attempts determine whether or not it is configured to support an SPVC that is affected by the address change. In an embodiment, because SPVCs act as PVCs at the edges of an ATM network, only edge nodes attempt to make the above described determination.

That is, recalling that manual prior art network management efforts are directed to the endpoints of the SPVCs, these manual network management efforts may be eliminated if only those nodes within the network that could behave as an SPVC source endpoint actively use the SIG information of the PTSP. As such, referring briefly back to FIG. 4, in one embodiment the non edge nodes of the network (e.g., node $102_4$ of FIG. 1) are configured to ignore the SIG contents of a PTSP having nodal address change information once the ID_# field 403 of the SIG is recognized.

As seen in FIG. 5, the nodal address found within the old prefix field 404 of the SIG information is compared 502 to the nodal address found within each of the SPVC prefixes currently supported by the node that received the PTSP. Where the nodal addresses match 503, an affected SPVC is found. That is, an SPVC is identified that: 1) is supported by the node receiving the PTSP; and 2) uses the node undergoing an address change as a destination endpoint node. For each match that occurs, the node that received the PTSP effectively replaces (within its SPVC records) the old nodal address information with the new nodal address information found within the new prefix field 405 of the SIG information. In one embodiment, a method includes: receiving PTSE information that has SIG information at a node within a PNNI ATM network, said the SIG information describing an address change of another node within the PNNI ATM network, the other node a destination endpoint for an SPVC that flows within the PNNI ATM network to the other node, the SIG information having an old address for the other node and a new address for the other node; comparing the old address for the other node with an SPVC destination node address maintained by the node to establish an SPVC connection supported by the node; and replacing the SPVC destination node address with the new address if the old address and the SPVC destination node address match.

Typically, a node is designed with a lookup table that lists the VPI-VCI information of each connection the node is currently configured to support. In an embodiment, the lookup table is configured to specify the destination endpoint address for each of those VPI-VCI listings that corresponds to an SPVC connection.

In this case, the aforementioned lookup table corresponds to the SPVC records referred to above; and, in order to implement the appropriate change, the lookup table will have the old destination endpoint address replaced with the new destination endpoint address. Once a node's SPVC records are updated, subsequent SPVC connections will be properly routed to the appropriate destination endpoint by the node.

According to the PNNI approach, a node that receives any PTSE information can "re-issue" the PTSE information so that other nodes may receive it as well. If the lifetime of the PTSE information is not limited in some manner, the constant re-issuing of the PTSE will result in its never being removed from the network. Thus, various techniques may be employed to ensure that the PTSE is removed from the network (preferably sometime after, at least, each source endpoint node is able to receive it). In an embodiment, the lifetime of an issued PTSP message is deliberately limited by allowing each node that receives it to keep it in within it's database for a limited time period. As is known in the art, the lifetime of PTSE information may be limited via manipulation of the PTSE lifetime field 311 originally shown in FIG. 3.

Recall from above that a destination endpoint node can be configured to issue a PTSP having SIG information that describes its address change as soon as the destination endpoint node realizes its address is being changed. In another embodiment, the SIG information can be released with the next scheduled broadcast of PTSE information. That is, rather than release the SIG information upon an event (i.e., the address change), the SIG information is released as part of a scheduled (e.g., periodic) status update. In a further embodiment, the SIG information is embedded in the next scheduled broadcast of nodal PTSE information (e.g., that is periodically broadcast as part of the PNNI nodal status information sharing scheme).

Another aspect of the PNNI protocol is that it is easily scalable. That is, referring briefly back to FIG. 1, the observed network 101 may actually be a small part of a much larger PNNI network that effectively interconnects various smaller networks (such as network 101) together. The interconnection as well as the other networks are not shown in FIG. 1 for convenience. According to the PNNI scheme, the smaller networks are referred to as peer networks.

As such, a larger PNNI network can be constructed by linking together a larger network of peer networks. Generally, a filtered or reduced flow of status/control information is shared between peers. That is, detailed status updating and event reporting (via the release of various PTSP packets) are exchanged within a peer network while less detailed status updating and event reporting are exchanged between peer networks. Nevertheless, in one embodiment, a PTSE having SIG information indicative of an edge node address change is exchanged between peer networks so that SPVCs that span across at least a pair of peer networks can be appropriately adjusted at an affected source endpoint node.

As routing and signaling protocols are often implemented with software, it is to be understood that embodiments of this invention may be used as or to support a software program executed upon some form of processing core (such as the CPU of a computer) or otherwise implemented or realized upon or within a machine readable medium. A machine readable storage medium includes read only memory (ROM); random access memory (RAM); magnetic disk storage media; optical storage media and flash memory devices. A machine readable transmitting medium includes electrical, optical, acoustical or other form of propagated signals (e.g., carrier waves, infrared signals, digital signals, etc.); etc.

Furthermore, it is noteworthy to point out that a network node (which may also be referred to as a networking node, a node, a networking system and the like) is a system designed to act as a switch or a router or other device that relays information from a first networking line to a second networking line. A depiction of a networking node 600 is observed in FIG. 6. A plurality of networking lines $601_1$ through $601_6$ (e.g., copper cables or fiber optic cables) are shown in FIG. 6 as being coupled to the networking node 600.

The node 600 is mostly responsible for collecting a traffic unit (e.g., a packet, a cell or a Time Division Multiplexed (TDM) time slot) from a first networking line (e.g., networking line $601_1$) and retransmitting at least a portion of it (e.g., its payload and various sections of its header) onto a second networking line (e.g., networking line $601_6$). As such, the node 600 effectively relays information so that it may be carried over various geographic distances. Some degree of intelligence is involved in the relaying process so that the traffic units being collected are forwarded onto an appropriate networking line (e.g., in light of their source address and destination address).

Figure 6:
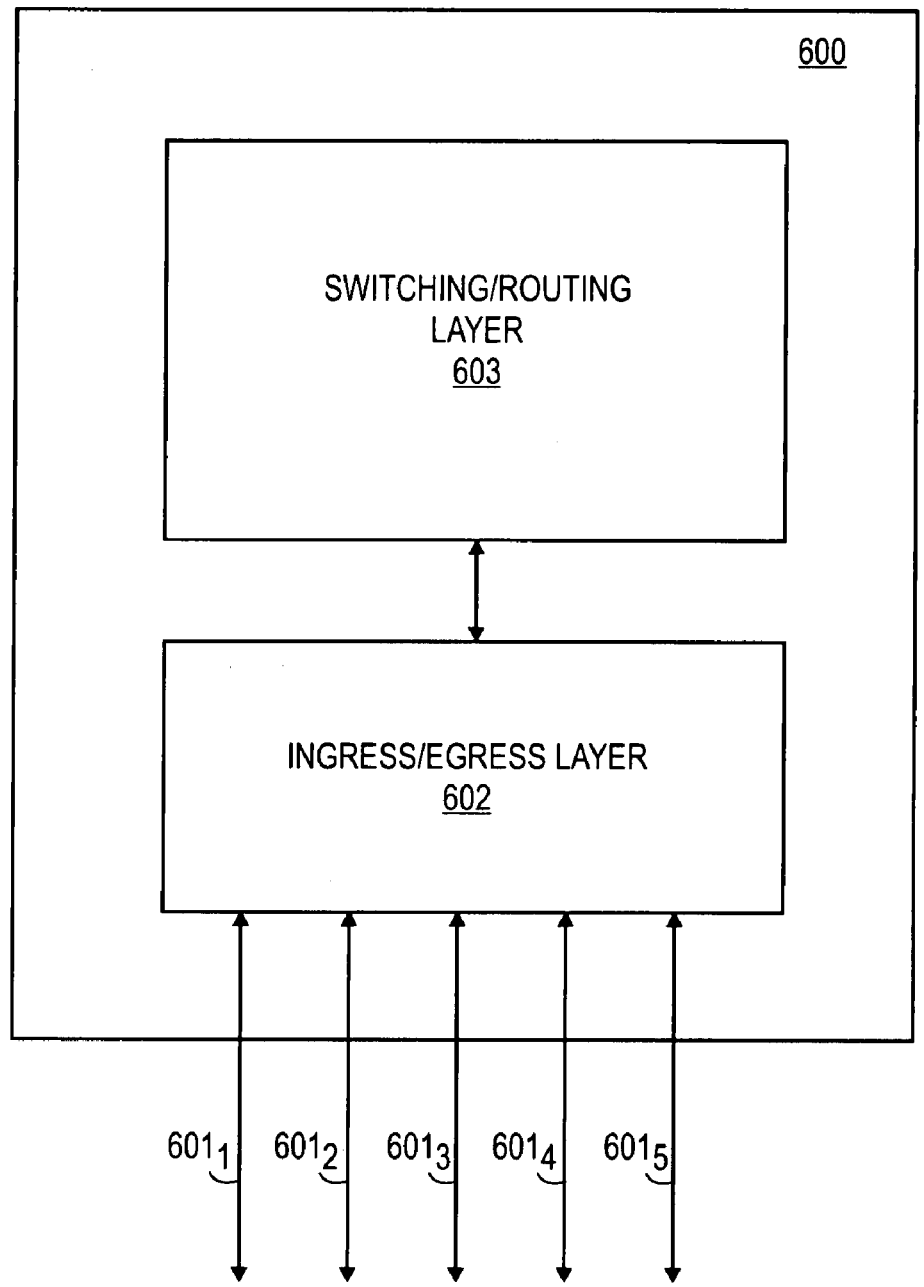
FIG. 6 shows an embodiment of a node.

As such, the node 600 of FIG. 6 shows an traffic ingress/egress layer 602 and a switching/routing layer 603. The ingress/egress layer 602 is responsible for collecting inbound traffic units from the networking lines upon which they arrived; and, presenting at least a portion of them (e.g., their header information) to the switching/routing layer 603. The ingress/egress layer 602 is also responsible for transmitting outgoing traffic units onto a networking line in response to the direction or control of the switching/routing layer 603.

The switching/routing layer 603 is responsible for effectively deciding which networking line is an appropriate networking line upon which a particular traffic unit should be transmitted upon. The switching/routing layer 603 often performs this activity based upon header information or other control information (such as SS7 based TDM connection information) associated with each traffic unit. Connection establishment and tear-down procedures (as well as network topology broadcasts or other networking overhead information) can often be viewed as being integrated into (or coupled to so as to communicate with) the switching/routing layer 603.

Note that the architecture of a networking system having a routing/switching layer 603 and an ingress/egress layer 602 may vary from embodiment to embodiment. For example, in some cases the switching/routing layer 603 may be designed onto a single card; or, in other cases, the switching/routing layer 603 may be designed across a plurality of cards. Also, in some cases the switching/routing layer 603 (or a portion thereof) may be integrated onto a Line Interface Card (LIC) that also acts as part of the ingress/egress layer 602.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for automatically updating a source node in a PNNI ATM network, comprising:
   a) receiving, at a destination node in said PNNI ATM network, a notification of an address change of said destination node, wherein said destination node comprises a destination endpoint for a soft permanent virtual circuit (SPVC) that connects said source node with said destination node;
   b) encoding said address change into a SIG field in a PNNI topology state element (PTSE);
   c) issuing said PTSE from said destination node to said source node; and
   d) decoding said address change and automatically updating said source node with said address change.

2. The method of claim 1 wherein said PTSE is embedded within a PNNI Topology State Packet (PTSP).

3. The method of claim 1 wherein said PTSE is issued as part of a scheduled broadcast of status information of said destination node.

4. The method of claim 1 wherein said PTSE is issued in response to said notification, said notification regarded as an event within said PNNI ATM network worthy of reporting to other nodes within said PNNI ATM network.

5. The method of claim 1 further comprising issuing said PTSE from said PNNI ATM network, said PNNI ATM network being a peer network within a larger PNNI ATM network.

6. The method of claim 1 wherein said PTSE has a limited lifetime within said PNNI ATM network.

7. The method of claim 1 wherein said notification is directed from a network management control station.

8. The method of claim 1 wherein said information describing said address change further comprises a new address for said destination node and an old address of said destination node.

9. The method of claim 1 wherein said address change is within an NSAP format.

10. A method for automatically updating a source node in a PNNI ATM network, comprising:
    a) receiving at said source node within said PNNI ATM network, information describing an address change of a destination node within said PNNI ATM network, wherein said destination node comprises a destination endpoint for a soft permanent virtual circuit (SPVC) that connects said source node with said destination node, said address change information comprising an old address for said destination node and a new address for said destination node, wherein said address change information is encoded within a SIG field in a PNNI topology state element (PTSE);
    b) decoding said address change information at said source node;
    c) comparing said old address for said destination node with an SPVC destination node address maintained by said source node to establish an SPVC connection supported by said source node; and
    d) replacing said SPVC destination node address with said new address if said old address and said SPVC destination node address match.

11. The method of claim 10 wherein said PTSE is embedded within a PTSP.

12. The method of claim 10 wherein said PTSE is issued as part of a scheduled broadcast of status information of said destination node.

13. The method of claim 10 wherein said PTSE is issued in response to said destination node being notified of said address change, said notification regarded as an event within said PNNI ATM network worthy of reporting to said node.

14. The method of claim 10 further comprising issuing said PTSE from said PNNI ATM network, said PNNI ATM network being a peer network within a larger PNNI ATM network.

15. The method of claim 10 wherein said PTSE has a limited lifetime within said PNNI ATM network.

16. The method of claim 10 wherein said address change is within an NSAP format.

17. A machine readable storage medium having stored thereon sequences of instructions which, when executed by a digital processing system, cause said system to perform a method for automatically updating a source node in a PNNI ATM network, comprising:

in response to a notification of an address change to a destination node in said PNNI ATM network, encoding said address change into a SIG field in a PNNI topology state element (PTSE);

issuing said PTSE from said destination node to said source node over a soft permanent virtual circuit (SPVC) connecting said destination node with said source node; and decoding said address change and updating said source node with said address change.

18. The machine readable storage medium of claim 17 wherein said PTSE is embedded within a PTSP.

19. The machine readable storage medium of claim 17 wherein said PTSE is issued as part of a scheduled broadcast of status information of said destination node.

20. The machine readable storage medium of claim 17 wherein said notification is regarded as an event within said PNNI ATM network worthy of reporting to other nodes within said PNNI ATM network.

21. The machine readable storage medium of claim 17 where said method further comprises issuing said PTSE from said PNNI ATM network, said PNNI ATM network being a peer network within a larger PNNI ATM network.

22. The machine readable storage medium of claim 17 wherein said PTSE has a limited lifetime within said PNNI ATM network.

23. The method of claim 17 wherein said information describing said address change further comprises a new address for said node and an old address of said node.

24. The method of claim 23 wherein said address change is within an NSAP format.

25. A machine readable storage medium having stored thereon sequences of instructions which, when executed by a digital processing system, cause said system to perform a method for automatically updating a source node in a PNNI ATM network, comprising:

a) receiving, at said source node within said PNNI ATM network, information describing an address change of a destination node within said PNNI ATM network, wherein said destination node comprises a destination endpoint for a soft permanent virtual circuit (SPVC) that connects said source node to said destination node, said address change information comprising an old address for said destination node and a new address for said destination node, wherein said address change information is encoded within a SIG field in a PNNI topology state element (PTSE);

b) decoding said address change information at said source node;

c) comparing said old address with an SPVC destination node address maintained by said source node to establish an SPVC connection supported by said source node; and d) replacing said SPVC destination node address with said new address if said old address and said SPVC destination node address match.

26. The machine readable storage medium of claim 25 wherein said PTSE is embedded within a PTSP packet.

27. The machine readable storage medium of claim 25 wherein said method further comprises issuing said PTSE from said PNNI ATM network, said PNNI ATM network being a peer network within a larger PNNI ATM network.

28. The machine readable storage medium of claim 25 wherein said address change is within an NSAP format.

* * * * *